Aug. 25, 1925.
W. D. KINCANNON
1,551,407
OUTLET VALVE FOR ELEVATED TANKS
Filed Dec. 7, 1923    2 Sheets-Sheet 1
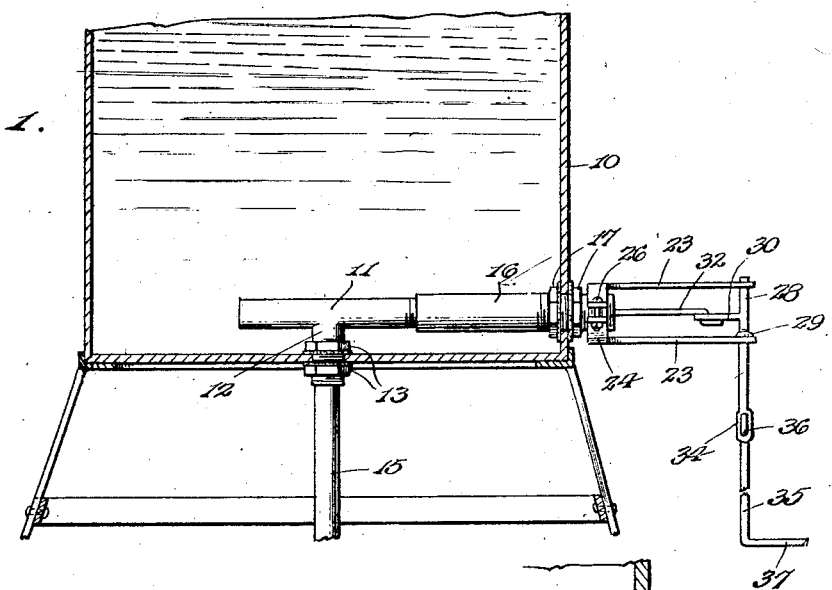
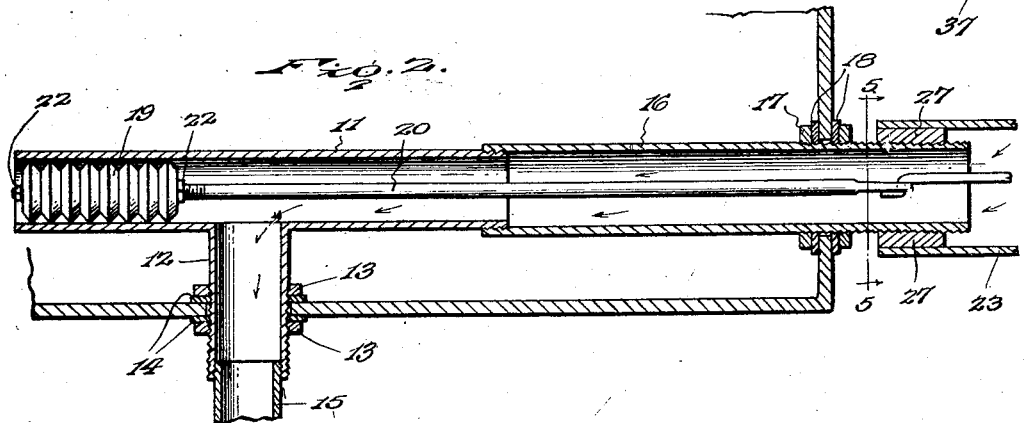
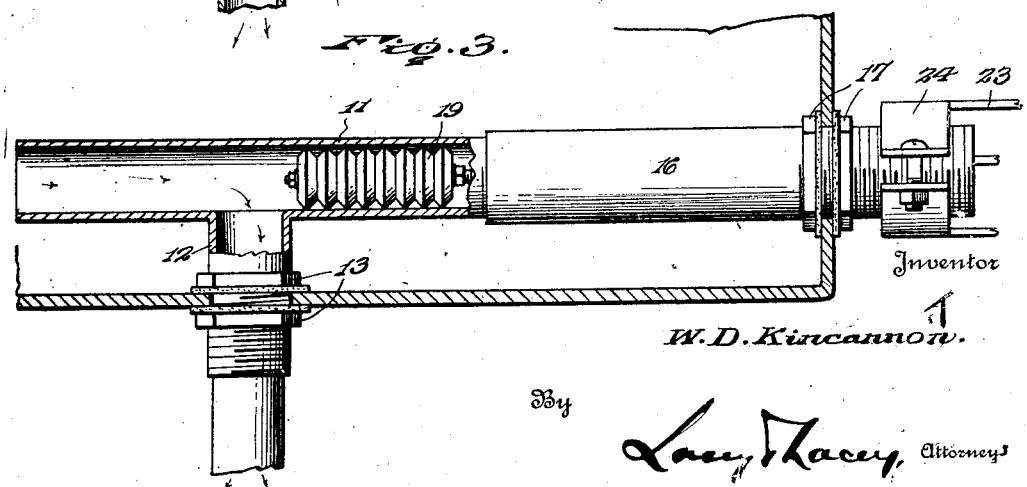
Inventor
W. D. Kincannon
By Lacy & Lacey, Attorneys Aug. 25, 1925.

W. D. KINCANNON

OUTLET VALVE FOR ELEVATED TANKS

Filed Dec. 7, 1923

1,551,407

2 Sheets-Sheet 2

Inventor

W. D. Kincannon.

By Lacy & Lacy, Attorney

Patented Aug. 25, 1925.                                            1,551,407

UNITED STATES PATENT OFFICE.

WILLIAM D. KINCANNON, OF LORENA, TEXAS, ASSIGNOR OF ONE-FOURTH TO NEWTON S. McBRAYER, OF LORENA, TEXAS.

OUTLET VALVE FOR ELEVATED TANKS.

Application filed December 7, 1923. Serial No. 679,226.

*To all whom it may concern:*

Be it known that I, WILLIAM D. KINCANNON, citizen of the United States, residing at Lorena, in the county of McLennan and State of Texas, have invented certain new and useful Improvements in Outlet Valves for Elevated Tanks, of which the following is a specification.

This invention relates to an improved outlet valve for elevated water tanks or the like and seeks, among other objects, to provide a valve wherein, when the valve is closed, air will be admitted to the outlet pipe of the tank so that said pipe may be drained to avoid freezing.

The invention seeks, as a further object, to provide a valve of piston type and wherein reciprocation of the valve in one direction will serve to cut off flow of water through the valve and coincidently admit air while, when the valve is reciprocated in the opposite direction, admittance of air will be stopped and flow of water coincidently permitted.

And the invention seeks, as a still further object, to provide novel means for reciprocating the valve.

Other and incidental objects will appear hereinafter.

Figure 4:
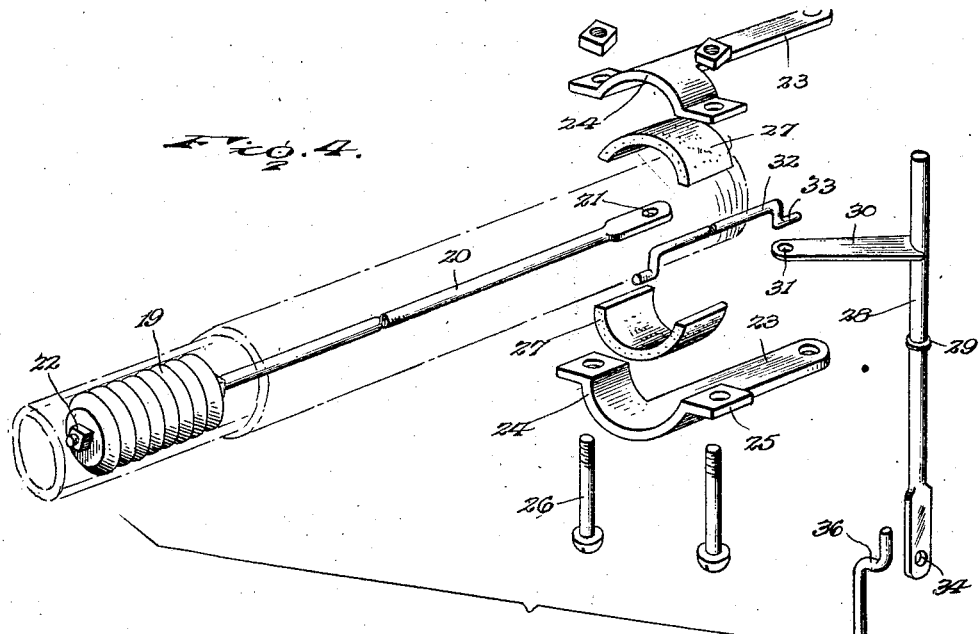
Figure 5:
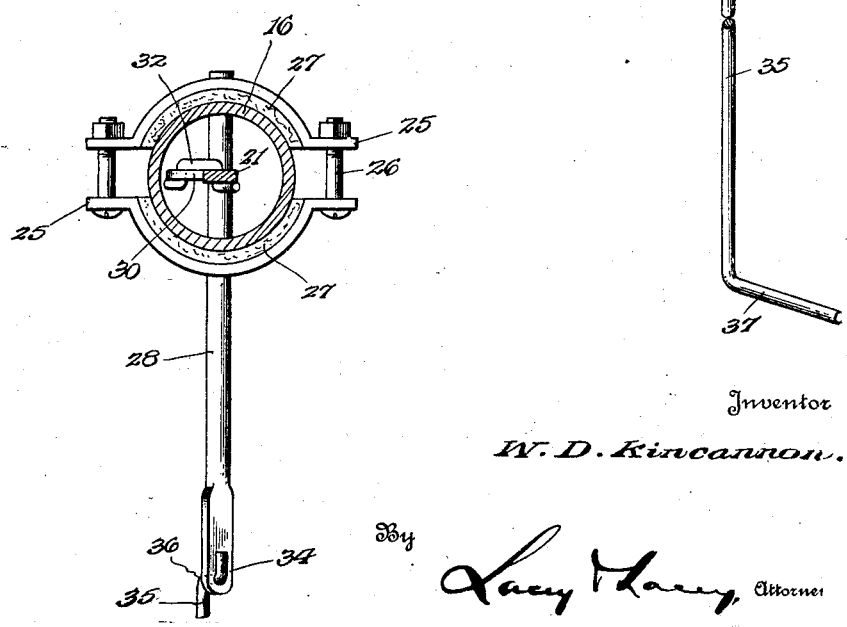

In the accompanying drawings:

Figure 1 is a fragmentary sectional view showing my improved valve installed upon a conventional elevated water tank, Figure 2 is an enlarged longitudinal sectional view showing the valve closed, Figure 3 is a view partly in elevation and partly in section, showing the valve open, Figure 4 is a detail perspective view showing certain parts of the valve disassembled but in proper relative position, and Figure 5 is a view on the line 5—5 of Figure 2, looking in the direction of the arrows.

Referring now more particularly to the drawings, I have shown my improved valve in connection with a conventional elevated water tank 10. A cylindrical valve casing 11 is employed, this valve casing being in the nature of a T and thus having a medial laterally directed outlet 12. In mounting the device, this outlet is inserted through the bottom wall of the tank and screwed thereon are nuts 13 between which and the opposite faces of the wall are arranged gaskets 14 clamped by the nuts to form a sealed joint between the outlet and the tank. Screwed into the outlet or otherwise connected thereto is an appropriate discharge pipe 15 and screwed or otherwise connected to the valve casing at one end thereof is a barrel 16 extending through the side wall of the tank. Screwed upon the barrel are nuts 17 confronting opposite faces of the tank wall and clamped by said nuts are gaskets 18 forming a sealed joint between the barrel and said wall. Slidable within the casing 11 is a valve 19 removably carried by a rod 20 which, as best shown in Figure 4, is provided at its outer end with a flattened eye 21 and screwed upon the rod are nuts 22 removably securing the valve thereon. The valve may be composed of a plurality of rubber or other suitable discs which, as shown, are arranged upon the rod 20 to be clamped in abutting relation by the nuts 22 and preferably, the discs are beveled at their peripheries. Annular pockets are thus defined between the discs while, due to the reduction in the area of contact of the discs with the valve casing, by the beveling of the discs, the valve may be constructed of considerable length without involving undue frictional drag between the valve and casing.

Mounted upon the outer end of the barrel 16 exteriorly of the tank 10 is a bracket comprising spaced parallel arms 23 formed at their inner ends with the halves 24 of a split collar surrounding the barrel. The halves of the collar are provided at their ends with ears 25 through which are engaged bolts or other suitable fastening devices 26 clamping the bracket upon the barrel and, preferably, packing strips 27 are employed between the collar and barrel to prevent mutilation of the threads of the barrel. Near their outer ends, the bracket arms 23 are provided with openings and journaled therethrough is a vertically disposed shaft 28 having a shoulder 29 to coact with the lowermost of said arms for supporting the shaft. The shaft is formed with a crank arm 30 which at its free end, is provided with an eye 31 and connecting said arm with the valve rod 20 is a pitman rod 32. At its ends this rod is formed with offsets 33 one to removably engage through the eye 21 of the valve rod and the other to removably engage through the eye 31 of the crank arm. Formed on the shaft 28 at its lower end is a flattened eye 34 and removably connected to said shaft is an operating rod 35 provided near its upper end with an offset 36 to engage through said eye and at its lower end with a laterally directed handle 37, the rod 35 being of a length to extend from the shaft 28 downwardly to a point near the ground or within easy reach.

As will now be seen in view of the foregoing description, the rod 35 may be grasped and turned for rotating the shaft 28 and reciprocating the valve 19. By turning the rod in one direction the valve 19 may, as shown in Figure 2, be moved to closed position lying at one side of the outlet 12 of the valve casing shutting off flow of water through the valve casing to the discharge pipe 15 while, coincidently, air will be permitted to enter through the barrel 16 to the outlet and consequently to the discharge pipe so that this pipe may drain. Freezing such as would occur were the water allowed to stand in the discharge pipe will accordingly be avoided. Likewise, by turning the rod in the opposite direction, the valve 19 may, as shown in Figure 3, be moved to open position lying at the opposite side of the outlet 12 of the valve casing when flow of air through said outlet will be shut off by the valve while water will be permitted to pass through the casing to the outlet and to the discharge pipe. I accordingly provide a particularly simple and efficient device for the purpose set forth and, as will now be appreciated, a valve which may be readily installed in practical use.

Having thus described the invention, what is claimed as new is:

1. The combination with a tank, of a tubular valve casing open at both ends and having one end extending through a side of the tank and provided between its ends with an outlet leading through the bottom of the tank, a piston valve in said casing consisting of a plurality of disks secured together in abutting relation and in axial alinement and having beveled edges, and means mounted on the outer end of the casing for reciprocating the valve across the outlet of the casing, the valve when at the inner side of the outlet cutting off flow of water from the tank and permitting air to enter through the outer end of the casing and escape through the outlet and when at the outer side of the outlet cutting off flow of air and permitting water to enter the inner end of the casing and pass through the outlet.

2. An outlet valve for tanks comprising a tubular valve casing open at both ends and having an outlet between its ends, one end of the casing being adapted to extend through a side of a tank and the outlet being adapted to extend through the bottom of the tank, a piston valve mounted in the casing and movable across the outlet, a collar on the outer end of the casing, arms projecting from said collar beyond the end of the casing parallel with the axis of the casing, a shaft journaled in the outer ends of said arms, means for rotating said shaft, a crank on said shaft between the arms having an eye at its end, a stem extending outwardly from the valve and having an eye at its outer end, a pitman having offset ends and having one end engaged in the eye of the crank and its opposite end engaged in the eye of the valve stem, and an operating rod engaged in and depending from the lower end of the shaft.

In testimony whereof I affix my signature.

WILLIAM D. KINCANNON. [L. S.]